(12) United States Patent
Rahle

(10) Patent No.: US 12,229,111 B2
(45) Date of Patent: Feb. 18, 2025

(54) DATA INSIGHTS

(71) Applicant: Palantir Technologies Inc., Denver, CO (US)

(72) Inventor: Bruno Rahle, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/411,448

(22) Filed: Aug. 25, 2021

(65) Prior Publication Data

US 2022/0067021 A1  Mar. 3, 2022

Related U.S. Application Data

(60) Provisional application No. 63/073,147, filed on Sep. 1, 2020.

(51) Int. Cl.
*G06F 16/23* (2019.01)
*G06F 16/242* (2019.01)
(Continued)

(52) U.S. Cl.
CPC ...... *G06F 16/2365* (2019.01); *G06F 16/2322* (2019.01); *G06F 16/244* (2019.01);
(Continued)

(58) Field of Classification Search
CPC ............. G06F 16/2365; G06F 16/2322; G06F 16/244; G06F 16/24573; G06F 16/2462; G06F 16/285; G06F 16/2477; G07C 9/38
(Continued)

(56) References Cited

U.S. PATENT DOCUMENTS 9,672,257 B2 * 6/2017 Tobin .................... G06F 16/248
10,726,354 B2 * 7/2020 Sainani ............... G06F 16/2471
(Continued)

FOREIGN PATENT DOCUMENTS

EP       3557436 A1 * 10/2019 .......... G06F 11/3089
EP       3961416         3/2022
WO   WO 2020/024799      2/2020

OTHER PUBLICATIONS

Official Communication for European Patent Application No. 21193654.7 dated Jan. 24, 2022, 7 pages.
(Continued)

*Primary Examiner* — Michael Pham
(74) *Attorney, Agent, or Firm* — Knobbe, Martens, Olson & Bear, LLP

(57) ABSTRACT

A data insight system generates an index of precalculated statistical attributes associated with massive data files, such as network log data, that allows improved access to statistical attributes associated with the data items. The system may partition time-based data items into segments based on one or more metadata criteria (e.g., product, status, deployment, environment, version, host, etc.), such as may be selected by a user. The system may then group the data items by time intervals (e.g., 1 minute, 60 minutes, 24 hours, etc.), and calculate one or more statistical attributes (e.g., sum, average, standard deviation, etc.) for each of the segments within each of the time windows. This statistical data may then be stored in association with the corresponding segment and time interval for access by one or more front end software applications.

17 Claims, 8 Drawing Sheets

(51) Int. Cl.
*G06F 16/2457* (2019.01)
*G06F 16/2458* (2019.01)
*G07C 9/38* (2020.01)

(52) U.S. Cl.
CPC .... *G06F 16/24573* (2019.01); *G06F 16/2462* (2019.01); *G07C 9/38* (2020.01)

(58) Field of Classification Search
USPC .......................................................... 707/688
See application file for complete search history.

(56) References Cited

U.S. PATENT DOCUMENTS

| | | | |
|---|---|---|---|
| 11,366,842 B1 * | 6/2022 | Swaminathan | G06F 16/2477 |
| 11,372,871 B1 * | 6/2022 | Tracey | G06F 11/3006 |
| 2006/0173878 A1 | 8/2006 | Bley | |
| 2010/0211618 A1 * | 8/2010 | Anderson | G06F 16/2474 |
| | | | 707/812 |

OTHER PUBLICATIONS

Official Communication for European Patent Application No. 21193654.7 dated May 8, 2023, 5 pages.
Official Communication for European Patent Application No. 21193654.7 dated Nov. 11, 2024, 10 pages.

* cited by examiner

DATA INSIGHTS

TECHNICAL FIELD

The present disclosure relates to systems and techniques for data integration, analysis, and visualization.

BACKGROUND

Existing database systems that store massive quantities of time-base data, such as network log data, can become very large in short time periods. Thus, generating analytics of this network log data may require copying of portions of a large database into accessible memory and processing the data logs to calculate the needed analytics.

SUMMARY

Statistical analysis of time-based data items may require significant processing and storage resources, particularly where analytics are requested for more remote time periods (e.g., further in the past, such as days or weeks prior to when the analytics are requested). Existing analytic systems may require generating statistical data on some or all of the intervening data, as well as the data from the requested time period, which may decrease efficiency and increase data processing requirements for generating such analytics.

Some of the embodiments of the present disclosure are related to the field of computer networks and network log data that is collected in these networks. Other embodiments are related to health applications, such as diagnosis systems. Yet other embodiments are related to controlling access to a building or an area. As disclosed herein, a data insight system generates an index of precalculated statistical attributes associated with massive data files, such as network log data, that allows improved access to statistical attributes associated with the data items. In some embodiments, the system partitions time-based data items into segments based on one or more metadata criteria (e.g., product, status, deployment, environment, version, host, etc.), such as may be selected by a user. The system may then group the data items by time intervals (e.g., 1 minute, 60 minutes, 24 hours, etc.), and calculate one or more statistical attributes (e.g., sum, average, standard deviation, etc.) for each of the segments within each of the time windows. This statistical data may then be stored in association with the corresponding segment and time interval for access by one or more front end software applications. For example, the pre-computed statistical attributes may be stored in a cloud server, e.g., in a data insights database, that is made accessible to multiple remote software applications. Thus, the system allows efficient identification and presentation of (precalculated) statistical information for a particular time period from a large set of temporally ordered events, such as large sets of network log data, health-related data, and/or any other data, which would require significantly more processing power and time to generate using existing analytics systems (e.g., Elasticsearch, Logstash, Kibana, Spark, and the like). Network log data is technical data that allows to monitor what happened to or in a computer network in the past. This data can identify issues on a computer network before they become problems.

While much of the description below is with reference to network log data, the same or similar systems and methods are applicable to other types of time based data (or "event data"), such as any sparse time series data that associates each data value with a discrete time point (or period). One example of event data that may be processed by a data insight system to generate data insights is job data. For example, a job may be any unit of work or unit of execution that may be requested by one computing resource from another computing resource (whether on the same computing device or one or more external computing devices). Jobs can be started in various manners, such as manually by a user, automatically by programmatic code, in response to triggers within code, via command line instructions, via a schedule, etc. Job logs, which may include information such as job description, job priority, request time, response time, data request size, data response size, etc., may be analyzed to generate data analytics using the systems and methods discussed herein. Besides network log data another example of event data is health data, such as data items related to a particular health concern, such as spread of an illness. For example, health event data items may indicate a time, location, diagnosis, patient status, testing method, etc. for each of multiple (e.g., millions, billions, or more) events, such as for individuals being tested for a disease, hospitalization, and death. Aggregation and pre-calculation of statistical attributes associated with this type of data may improve the speed and efficiency of analysis of the data. In some of the embodiments, the user may be provided with a notification or alarm that he or she should not visit a certain area because of health concerns. In some of these embodiments, this information may be provided in real-time. In other embodiments, the system may be connected with an area/building access system. Should the system determine that there is, e.g., a health concern when entering an area/building, the system may provide output control data that may be used for a further technical use. For example, the data may be used to deny access to the area/building. In some of these embodiments, the access may be denied in real-time since the system allows for fast data processing achieved by the aggregation and pre-calculation of statistical attributes. In some of the embodiments, health data may be analysed in order to provide a diagnosis or a patient status. In some of these embodiments, the diagnosis may be provided in real-time. In other embodiments, the output control data may be used to manage a computer network. In some of these embodiments, the computer network may be managed in real-time.

Accordingly, in various embodiments, large amounts of data items are automatically and dynamically analyzed to calculated statistical attributes representative of the data items, and the calculated statistical attributes are searchable, filterable, and displayable via various user interfaces in an efficient and compact manner. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems. In some of the embodiments, an interactive user interface and the content presented therein assist a user in performing a technical task by means of a continued and/or guided human-machine interaction process. For example, the user may be informed in real-time about issues in a computer network based on the analysis of the network log data and he or she may interact with the interactive user interface to remedy the issues, e.g., by being provided with options (e.g., actions) how to react thereon. The interactive user interface may then provide the user with information about the immediate effect of the actions that he or she has taken. Thereby the user may interactively control a system in real-time.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

DETAILED DESCRIPTION

Overview

Figure 1:
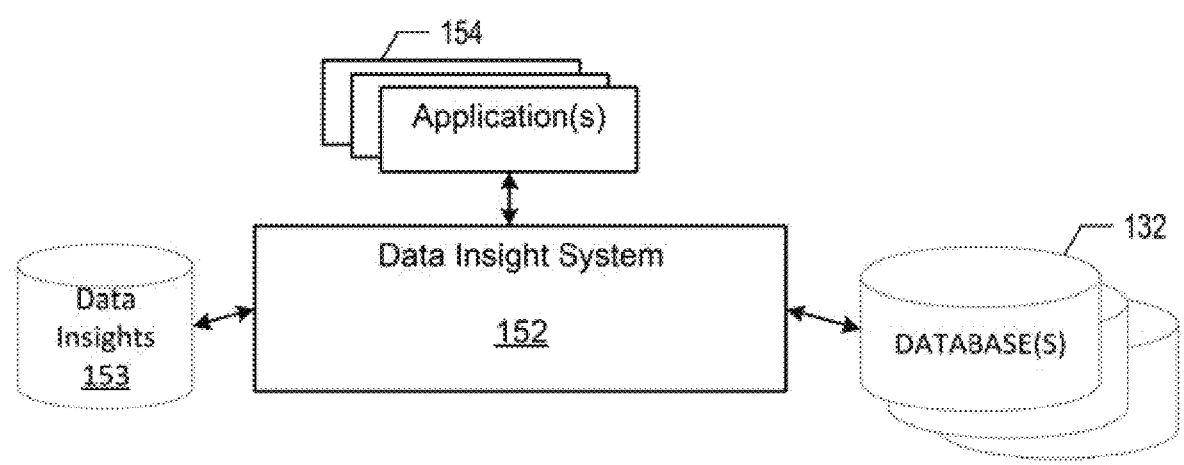
FIG. 1 is a block diagram illustrating one embodiment of an example data insight system.

As disclosed herein, a data insight system generates an index of precalculated statistical attributes associated with massive data files, such as network log data, that allows improved access to statistical attributes associated with the data items. In some embodiments, the system partitions time-based data items into segments based on one or more metadata criteria (e.g., product, status, deployment, environment, version, host, etc.), such as may be selected by a user. The system may then group the data items by time intervals (e.g., 1 minute, 60 minutes, 24 hours, etc.), and calculate one or more statistical attributes (e.g., sum, average, standard deviation, etc.) for each of the segments within each of the time windows. This statistical data may then be stored in association with the corresponding segment and time interval for access by one or more front end software applications. For example, the pre-computed statistical attributes may be stored in a cloud server, e.g., in a data insights database, that is made accessible to multiple remote software applications. Thus, the system allows efficient identification and presentation of (precalculated) statistical information for a particular time period from a large set of temporally ordered events, such as large sets of network log data, health-related data, and/or any other data, which would require significantly more processing power and time to generate using existing analytics systems (e.g., Elasticsearch, Logstash, Kibana, Spark, and the like).

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Time-based data item (or "event data" or "data item"): Data associated with a discrete time point (e.g., as may be indicated by a timestamp) or time period, one or more data values, and zero or more metadata values. The data items may be input data, for example network log data or health-related data. In some of the embodiments, the analysis of the system may be used to control a system and the output data may be data to control an external technical system, such as an area/building access system or a computer network that is being managed in real-time.

Time interval: Time period having discrete start and stop time (or a start time and duration, from which stop time can be calculated), such as the one minute time window defined by 2018-02-03 07:30:00 to 2018-02-03 07:30:59.

Segment: A grouping of data items with some common characteristic, such as the same or similar metadata (e.g., metadata that meets segment criteria set by a user). Data items associated with a segment may be identified based on metadata criteria.

Full segment: A combination of a segment and a particular time interval. For example, a segment may have a full segment for each of multiple time intervals.

Statistical attributes: Any representation of a group of data items, such as a sum, an average, a standard deviation, a count, a distinct count, a minimum, a maximum, one or more percentiles, or one or more approximate percentiles.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example System Overview

FIG. 1 illustrates one embodiment of an example data insight system 152. In the embodiment of FIG. 1, the data insight system 152 communicates with a database(s) 132 that may store large masses of data items, such as event data items. For example, the database 132 may include one or more storage devices that store data in one or more of various formats, such as a tabular data format (SQL, delimited, or a spreadsheet data format), a data log format (such as network logs), and/or other time series data (such as sensor data). In some of the embodiments, the sensor data may be input data that is obtained from a technical system that is to be monitored and/or analysed. The data insight system 152 is configured to access the data items and generate data insights 153 that may be used by various applications 154 and/or other software processes, such as is discussed in further detail below. For example, the applications 154 can include applications that enable users to view data sets, interact with data sets, filter data sets, and/or configure data set transformation processes or builds.

Figure 2:
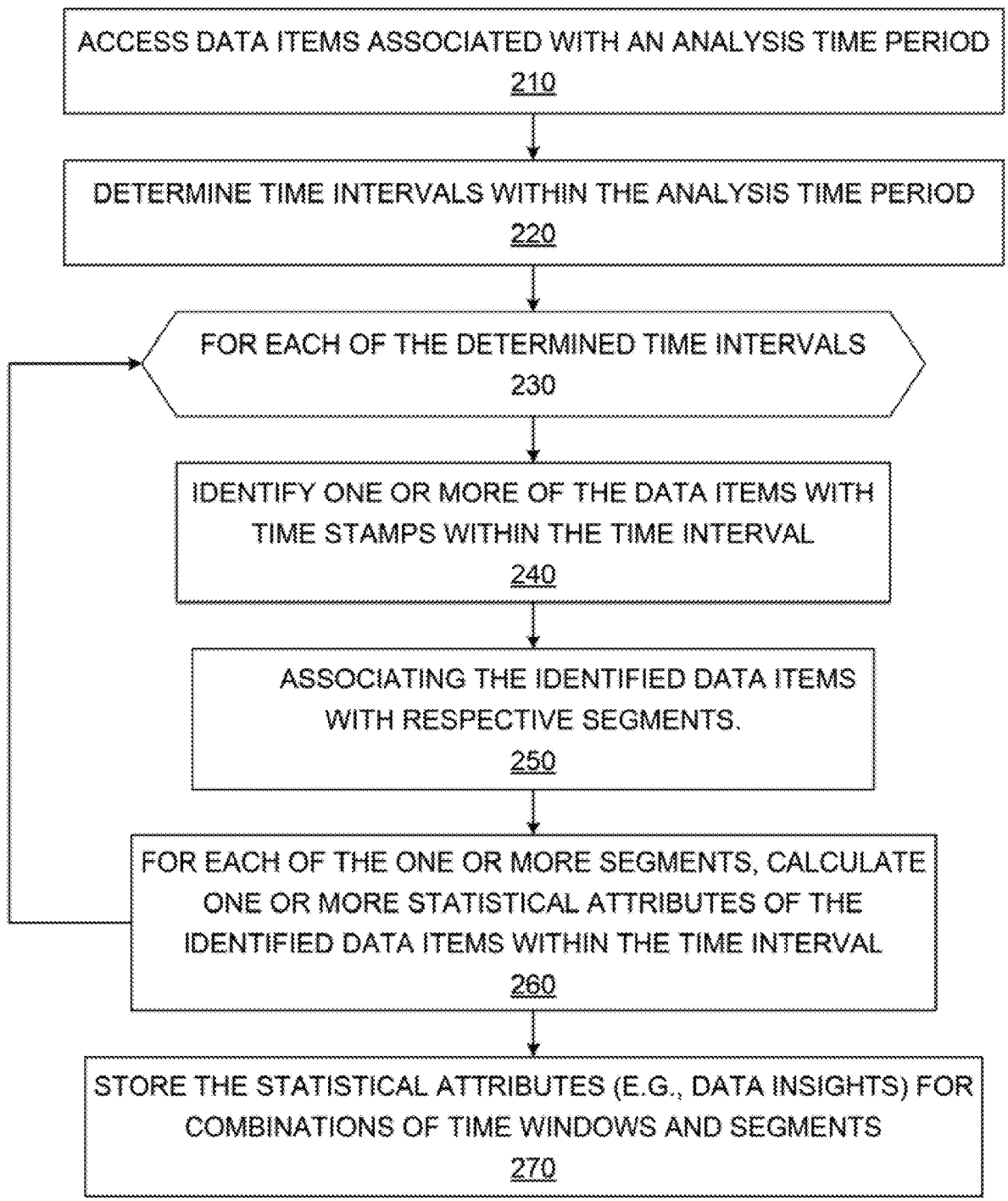
FIG. 2 is a flowchart illustrating one example of a method that may be performed by a data insight system, such as the data insight system of FIG. 1.

FIG. 2 is a flowchart illustrating one example of a method that may be performed by a data insight system, such as data insight system 152 of FIG. 1. Depending on the embodiment, additional or fewer blocks may be included and/or the blocks may be performed in an order different than is illustrated.

Beginning at block 210, the data insight system 152 accesses a plurality of data items associated with an analysis time period. For example, in some embodiments the data insight system 152 may be configured to generate data insights for data items at a defined interval, such as every 24 hours (e.g., nightly at 2 AM), 12 hours, six hours, three hours, two hours, one hour, etc. In some embodiments, the data items may be accessed on a more dynamic schedule, such as in response to an indication that a threshold amount (e.g., quantity or size on disk) of data items since the last generation of data insights are available. In other embodiments, other triggers for initiating access of data items may be implemented.

In the examples discussed herein, the data items each include a timestamp and one or more data values. The timestamp may be in any understandable format and the data value may be associated with any attribute or characteristic. For example, in a network log data set, event data may indicate a time that a particular endpoint of a particular software service was accessed by some user on a particular host at the given time. The data items may further include additional data values associated with size of the request, size of the response, status of the response, etc. In some embodiments, any other type of data items may be accessed in block 152. Depending on the embodiment, the data items may be temporarily copied to a local storage device of the data insight system 152 and/or may be accessed directly on a remote or other storage device.

Moving to block 220, the data insight system 152 determines time intervals associated with the analysis time period. For example, time intervals may be defined by the user as minutely, hourly, daily, weekly, etc. Thus, a 24 hour analysis time period may be divided into 24×60=1,440 minute time intervals.

Next, at block 230, for each of the determined time intervals, the data insight system performs a partitioning and data insight calculation process, such as the example process of blocks 240-270. In particular, at block 240, for the current time interval (e.g., a one minute time interval), data items having a timestamp within that time interval are identified. Next, at block 250, each of the data items identified in block 240 are associated with one or more segments. In some embodiments, a user defines metadata criteria associated with segments. For example, a segment may include data items having a particular metadata value within a defined value range. In the context of network logs, a user may select to segment based on attributes such as URL, size of request, size of response, time from request to response, and the like.

Next, at block 260, for each of the one or more segments, the data insight system 152 calculates one or more statistical attributes of those identified data items within the time interval. Finally, at block 270, the statistical attributes are stored, in association with the corresponding time interval and segment, for later access by various software processes. With reference to FIG. 1, for example, the statistical attributes may be stored as data insights 153 that are accessible by the applications 154. Advantageously, because the data insights 153 does not include each of the data items that was used in generating the statistical attributes, the data insights 153 has a much smaller size (than the corresponding data items). Accordingly, in some implementations the data insights 103 may be stored in a cloud environment and made accessible to multiple users at various locations (e.g., with minimal or no copying of the actual data insights 153 to the user machine).

In some implementations, an updated set of statistical attributes is determined as each new time interval passes.

For example, if the time interval is five minutes, every five minutes a process similar to that described with reference to blocks 240-270 may be performed on the data items from the five minute time interval. Advantageously, generation of the statistical attributes does not require access to data items from any previous time intervals.

Figure 3:
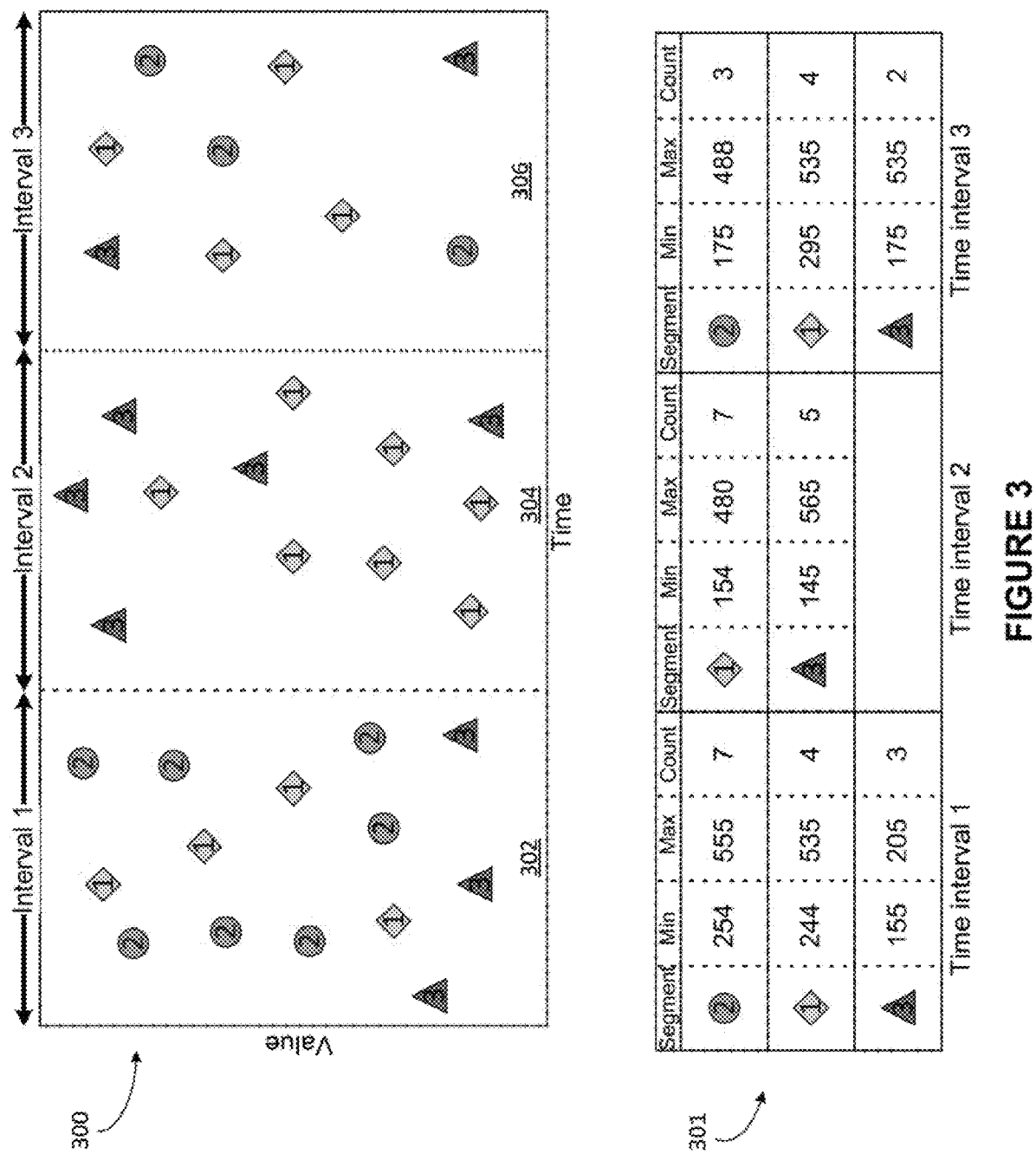
FIG. 3 depicts a conceptual visualization of data items as they are processed in developing data insights.

FIG. 3 depicts a conceptual visualization of data items as they are processed in developing data insights. In the example of FIG. 3, visualization 300 indicates how a plurality of data items, which are represented by circles, diamonds, and triangles, are separated into time intervals, including time interval 302, 304, and 306. As noted above, time intervals may be a user-defined and/or automatically determined time interval, such as 30 seconds, one minute, 30 minutes, one hour, etc. In this example, each of the data items has already been assigned a segment, such as based on one or more metadata values (e.g., product, status, deployment, environment, version, host, etc.) associated with the respective data item. In particular, each of the first data items represented by a yellow diamond includes metadata values matching a first segment criteria, each of the second data items represented by a circle includes metadata values matching a second segment criteria, and each of the third data items represented by a blue triangle includes metadata values matching a third segment criteria.

With the data items assigned to segments and further partitioned into time intervals (e.g., intervals 302, 304, 306), data insights for each of the segments and intervals may be calculated. In the example of FIG. 3, a data insights table 301 is illustrated as including three statistical attributes: a minimum value, a maximum value, and a raw count of data items for each segment within each time interval. In this example, for interval 302 the raw count of data items associated with that time interval is seven data items for segment two, four data items for segment one, and three data items for segment three. Minimum and maximum statistical attributes indicate that within interval 302, the minimum value for second segment data items is 254 and the maximum value is 555, while within interval 306, the minimum value for second segment two data items is 175 and the maximum value is 488.

As noted elsewhere, the data insights may include any statistical representation of data items within a segment and a particular time interval. These data insights may include statistical calculations of one or more sum, average, standard deviation, count, distinct count, minimum, maximum, percentile, approximate percentiles, and the like. For example, multiple percentiles for a particular data item value (e.g., response size values of network logs) may be identified and stored in a data insights table (e.g., in separate columns of a data insights table). Thus, a user may request that when the data insights are generated, multiple probabilities for a particular data item value within each interval are identified and stored. For example, multiple percentile values (e.g., P0, P50, P90, P100, etc.) of data items may be identified from the same, or similar, set of data items. For example, multiple percentile values of a particular data value (e.g., response size) for each full segment may be calculated.

In some embodiments, the statistical attributes (e.g. for each of multiple time intervals) are stored in a data insights database, such as data insights 153 in FIG. 1, which are accessible by data analysis and visualization tools. For example, data insights for a particular time interval may be accessed via the data insights database, without accessing the actual data items.

Using existing data analysis technology, in the context of network request logs, for example, if a user desires data analytics for a one minute time window from multiple days prior, a very large request log may need to be loaded into memory (e.g., a multiple terabyte file that includes data from a much larger time period) in order to identify data items within the particular one minute time window and then to generate statistical attributes for those data items. Conversely, using the data insight system and methods disclosed herein, pre-compiled statistical attributes for that same 1 minute time window that are stored in a data insights database may be quickly and efficiently accessed (e.g., without requiring access to the actual request log data items and without requiring calculation of the statistical attributes on the fly).

Figure 4:
FIG. 4 illustrates an example data insights table.

In some embodiments, data insights may be stored in a table. However, in other embodiments the data insights may be stored in any other data structure. FIG. 4 illustrates an example data insights table 400. In this example, each row of the table represents a combination of a particular interval and segment, as well as the statistical attributes that are calculated for that particular time interval and segment, and some extra data. In other embodiments, other types of data may be included in a data insights table and/or the data may be stored in a different manner.

In the example of FIG. 4, the data insights table includes columns for several inputs including a timestamp 402 (associated with a particular interval), such as a floor of a time interval within which a data item falls, a product 404, a status 406, a method 408, and a path 410. The statistics columns 420-426 include columns for a time period 420, a duration_avg 422, a duration_max 424, and a duration_min 426, where the duration columns 422-426 may be associated with a duration from receiving a network request and responding to the network request. Any number of additional statistics may be included. The extra data columns include columns for aggregation 432, segment 434, full segment 436, and unique ID 438. In this example, the aggravation 432 indicates the period 420 and a segmenting (or grouping) criteria, which in this example is by product, status, method, and path. The segment 434 includes the particular product, status, method, and path associated with that row, the full segment 436 further includes the period 60, and the unique ID 438 further includes the timestamp 402. Thus, the unique ID 438 is usable to uniquely identify a particular segment and time interval. In some embodiments, the segment and full segment information may only be included as part of the unique ID.

Figure 5:
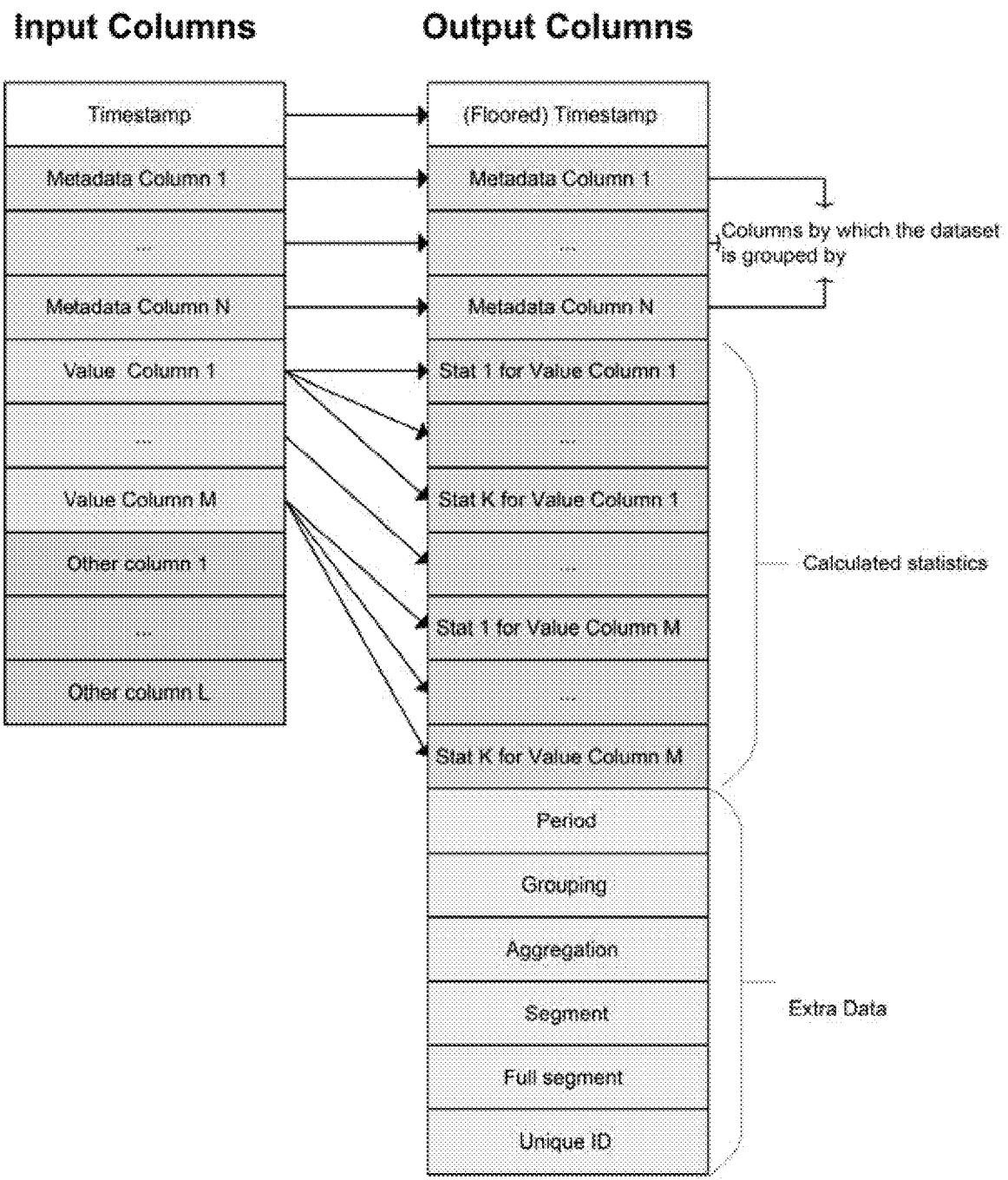
FIG. 5 is a diagram illustrating how the various input columns are transformed into output columns and stored as data insights, such as in the example data insights table of FIG. 4.

FIG. 5 is a diagram illustrating how the various input columns are transformed into output columns and stored as data insights, such as in the example data insights table 400 of FIG. 4. In some embodiments, one or more intermediate columns may also be used in moving from the input columns to the output columns. Depending on the embodiment, the input columns, output columns, and any intermediate columns may vary.

Figure 6:
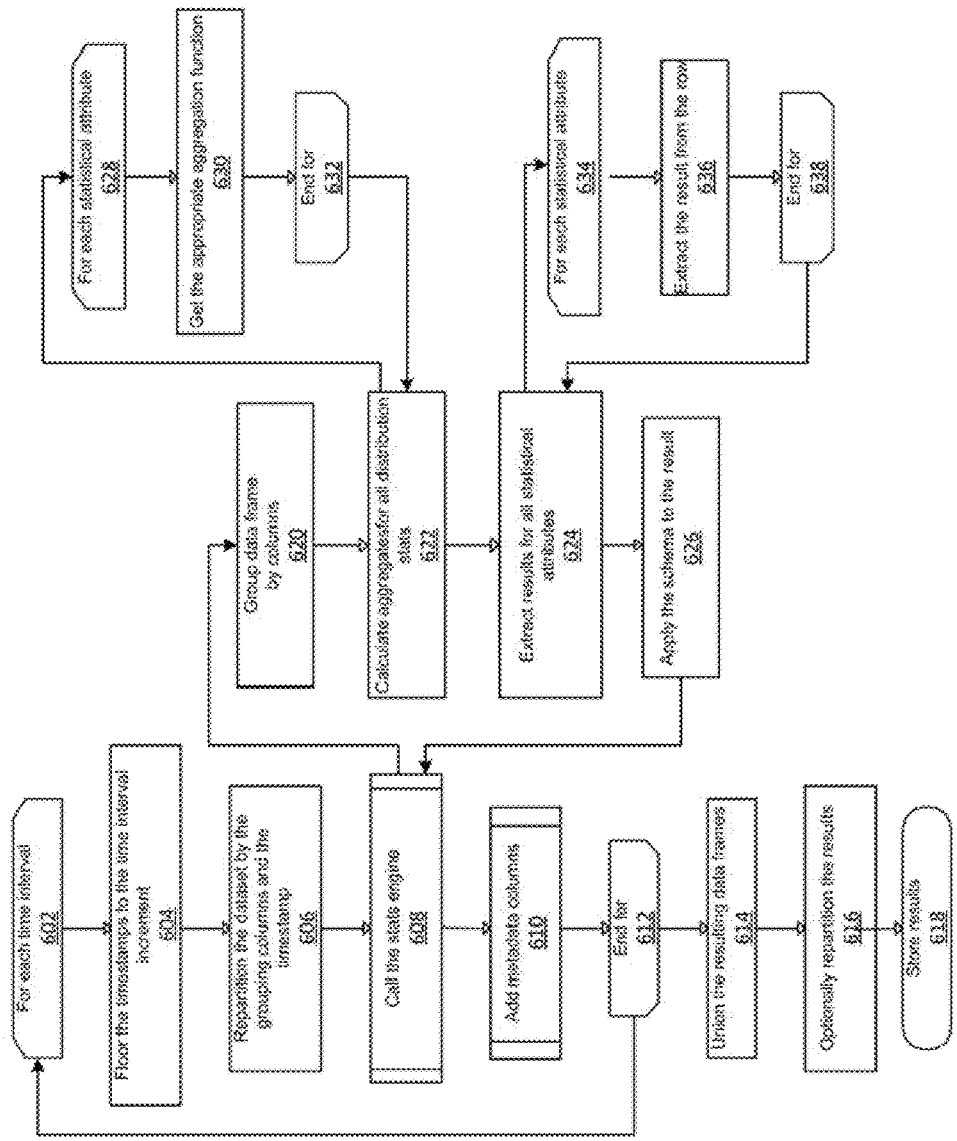
FIG. 6 is another flowchart showing a method of pre-calculating statistical attributes for combinations of metadata and time intervals.

FIG. 6 is another flowchart showing a method of pre-calculating statistical attributes for combinations of metadata and time intervals. In some embodiments, additional and/or fewer blocks may be performed and/or the blocks may be performed in an order different than is illustrated.

Beginning with block 602, a loop that ends with block 612 is performed for each time interval. With reference to the example of FIG. 4, for example, the interval would be 60 seconds (e.g., as indicated in column 420).

Next, at block 604, the timestamps are floored to the time interval start time. Thus, for an example time interval of one minute, the timestamps of the data items are each floored to be the start time of that one minute time interval. In other implementations, the timestamps may be set to a ceiling, median, or any other agreed-upon representation of the time interval.

Moving to block 606, the data set is repartitioned based on the grouping columns and the timestamps. As noted above, the data set may include a batch of data items that have accumulated over a predetermined time period, such as prior 1, 12, or 24 hours, for example.

Next, at block 608, a stats engine is called to generate the statistical attributes for the particular time interval. The data insight system 152 of FIG. 1 may include a stats engine, for example. The stats engine performs a process of grouping the data by columns and then calculates each of the indicated statistical attributes for that particular row at block 622 and corresponding loop 628-632. The statistical attributes calculation loop 628-632 determines the statistical attributes for each of multiple statistical attributes that are selected by default and/or by the user, with each being stored in its own column of the data insight table in one embodiment.

Once the statistical attributes are calculated, the method returns to block 624, which calls loop 634-638 where the results for all the aggregated statistical attributes are extracted. For example, the multiple statistical attributes for a particular row are extracted. The method returns to block 626, where a desired schema for the results may be applied, such as to format the data in a table format (e.g., FIG. 4) or any other desired format.

With the calculated statistical attributes extracted and formatted to the appropriate schema, the method returns to block 610, where metadata columns are added to the row, such as to indicate the unique ID, segment, full segment, etc.

At block 614, the data frames for each of the time intervals are combined, such as by combining rows that are generated by multiple runs of the loop 602-612 into a multi-row, multi column table (e.g. FIG. 4).

At block 616, the results may optionally be repartitioned, and then stored in block 618, such as in a data insight data store (e.g., data insights 153 of FIG. 1).

Figure 8:
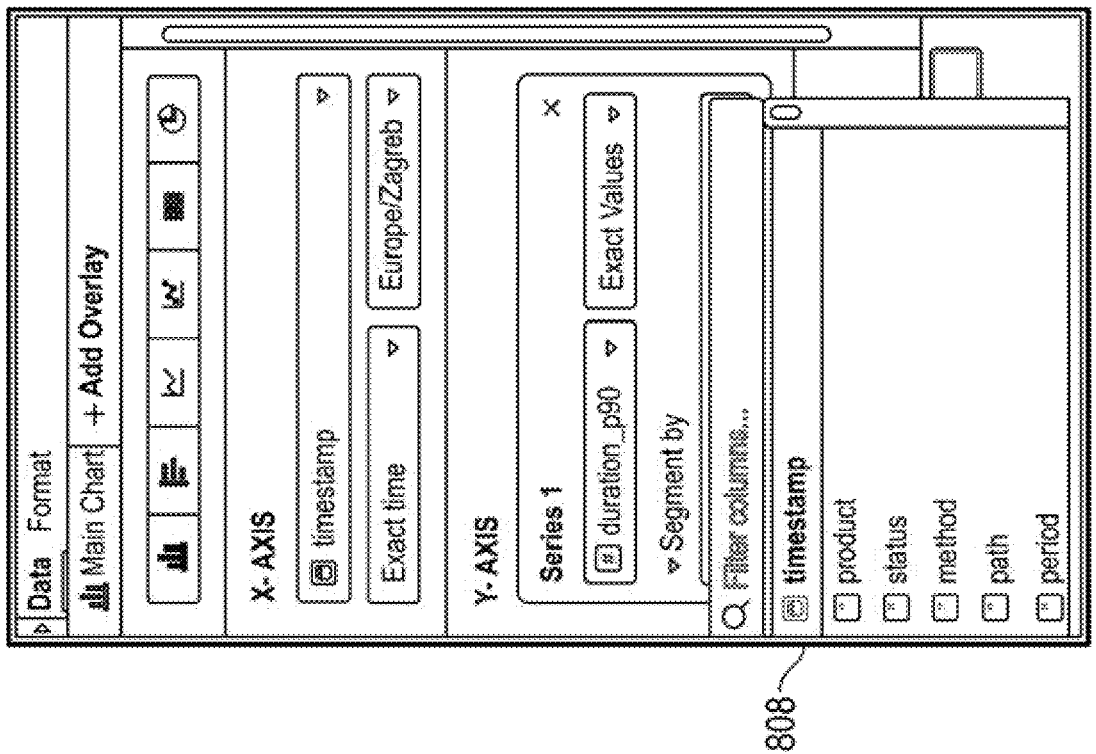
FIG. 7 and FIG. 8 are example user interfaces of an application may be used to access statistical aggregation data from a data insights database.
Figure 7:
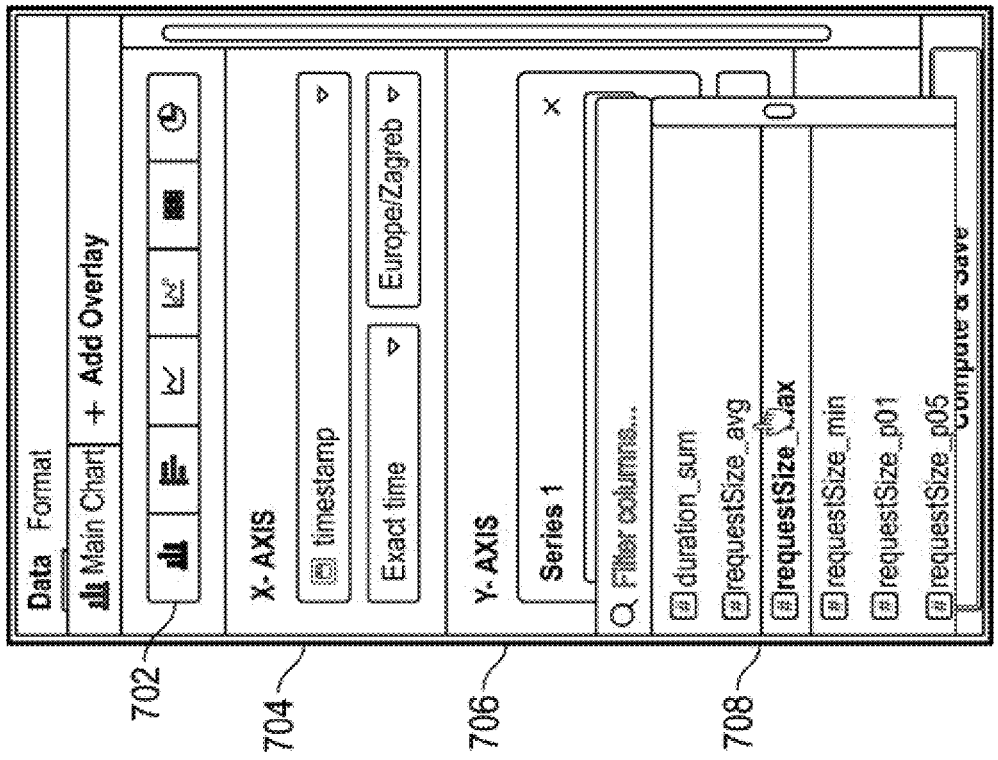

FIG. 7 and FIG. 8 are example user interfaces of an application that may be used to access statistical aggregation data from a data insights database. In the example of FIG. 7, the user interface includes a chart type selection 702, an X-axis attribute selection 704, and a Y-axis attribute selection 706. Depending on the embodiment, various charts and visualizations may be available in the chart type selection 702. In this example, the user has selected a bar chart, and has indicated that the X-axis should show a range of time stamps of the corresponding data insights. The Y-axis selection area 706 shows a selection window 708 indicating the available columns that can be selected for display on the Y-axis. The available columns include, for example, the calculated statistical attributes stored in the data insights database.

FIG. 8 illustrates the same user interface, after a Y-axis attribute has been selected, in this case duration_P90 has been selected, which may correspond to the 90th percentile value of duration data values for data items within the time interval. In the example of FIG. 8, a segment by selection area 808 is also shown, with a selection window showing available columns for segmenting. The available columns may include the user selected categories, such as product, status, method, path, etc. in the example of FIG. 4. With this information provided via the user interface, a result chart or other visualization may be displayed based on access of the data insights table (or other data structure), to quickly and at a low cost to processing resources, obtain the statistical aggregation data for combinations of time intervals and segments.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
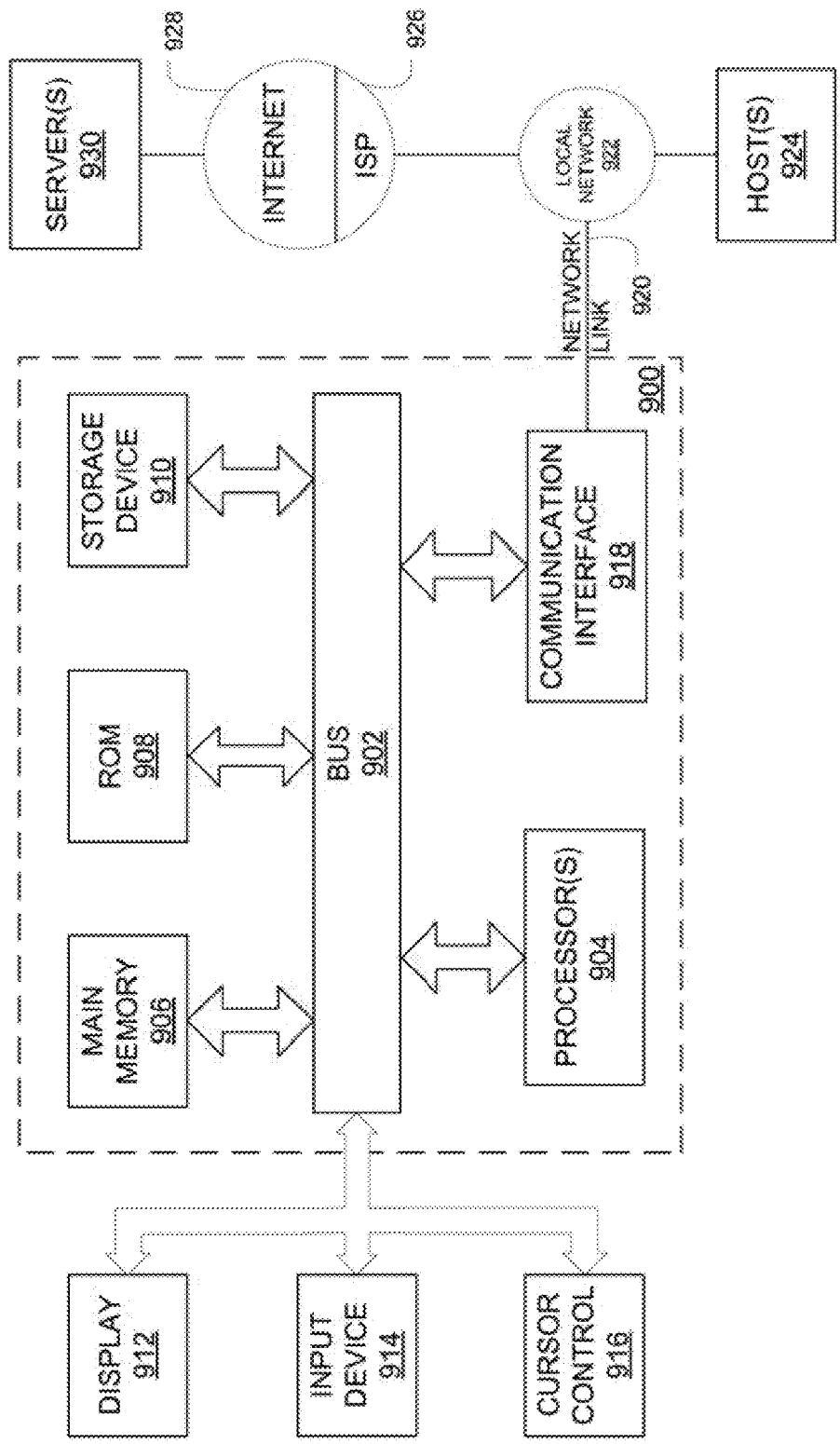
FIG. 9 is a block diagram that illustrates a computer system upon which various embodiments may be implemented.

For example, FIG. 9 is a block diagram that illustrates a computer system 900 upon which various embodiments may be implemented. For example, the data insight system 152 (FIG. 1) may comprise some or all of the components and functionality of computer system 900.

The Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
   a hardware computer processor;
   a non-transitory computer readable medium having software instructions stored thereon, the software instructions executable by the hardware computer processor to cause the computing system to perform operations comprising:
   accessing a plurality of event data items associated with an analysis time period, each of the event data items including a timestamp, a non-time related data value indicating network log data or health-related data, and a metadata value;
   determining a first time interval of a plurality of time intervals within the analysis time period;
   identifying those event data items of the plurality of event data items with time stamps within the first time interval;
   for a first segment of a plurality of segments associated with a first metadata criteria:
      identifying any event data items having a time stamp within the first time interval matching the first metadata criteria;
      associating the identified event data items with the first segment; and
      calculating a first statistical attribute from the data values of the identified event data items associated with the first segment;
   for a second segment of the plurality of segments associated with a second metadata criteria different than the first metadata criteria:
      identifying any event data items having a time stamp within the first time interval matching the second metadata criteria;
      associating the identified event data items with the second segment; and
      calculating one or more second statistical attributes from the data values of the identified event data items associated with the second segment; and
   storing, in a data insights database, in association with the first time interval:

a first indication of the first metadata criteria and the first statistical attribute for data items with timestamps within the first time interval; and a second indication of the second metadata criteria and the second statistical attribute for data items with timestamps within the first time interval;

wherein the first or the second metadata criteria used to partition time-based data items includes one or more of: a URL or a time from request to response.

2. The computing system of claim 1, wherein each of the plurality of segments is associated with one or more-metadata criteria indicative of metadata values of data items required for inclusion in the respective segment.

3. The computing system of claim 1, wherein the first or the second metadata criteria are received from user input.

4. The computing system of claim 1, wherein the plurality of segments and associated statistical attributes for all of the time intervals within the analysis time period are stored in a single data set.

5. The computing system of claim 1, wherein the first or the second statistical attributes include one or more of: a sum, an average, a standard deviation, a count, a distinct count, a minimum, a maximum, one or more percentiles, or one or more approximate percentiles.

6. The computing system of claim 1, wherein the software instructions are further configured to cause the computing system to perform operations comprising:
receiving user input indicating a requested time period;
identifying, in the data insights database, one or more time intervals associated with the requested time period;
aggregating statistical attributes of the identified one or more time intervals associated with the requested time period; and
causing presentations in a user interface of at least some of the aggregated statistical attributes.

7. The computing system of claim 1, the operations further comprising:
controlling an external technical system based on the first or the second indications of the first or the second segments and the associated the first or the second statistical attributes associated with the first time interval, wherein the external technical system is a computer network or an area or building access system that is being controlled in real-time.

8. A computerized method, performed by a computing system having one or more hardware computer processors and one or more non-transitory computer readable storage device storing software instructions executable by the computing system to perform the computerized method comprising:
accessing a plurality of event data items associated with an analysis time period, each of the event data items including a timestamp, a non-time related data value indicating network log data or health-related data, and a metadata value;
determining a first time interval of a plurality of time intervals within the analysis time period;
identifying those event data items of the plurality of event data items with time stamps within the first time interval;
for a first segment of a plurality of segments associated with a first metadata criteria:
identifying any event data items having a time stamp within the first time interval matching the first metadata criteria;
associating the identified event data items with the first segment; and
calculating a first statistical attribute from the data values of the identified event data items associated with the first segment;
for a second segment of the plurality of segments associated with a second metadata criteria different than the first metadata criteria:
identifying any event data items having a time stamp within the first time interval matching the second metadata criteria;
associating the identified event data items with the second segment; and
calculating one or more second statistical attributes from the data values of the identified event data items associated with the second segment; and
storing, in a data insights database, in association with the first time interval:
a first indication of the first metadata criteria and the first statistical attribute for data items with timestamps within the first time interval; and
a second indication of the second metadata criteria and the second statistical attribute for data items with timestamps within the first time interval;
wherein the first or the second metadata criteria used to partition time-based data items includes one or more of: a URL or a time from request to response.

9. The computerized method of claim 8, wherein each of the plurality of segments is associated with one or more-metadata criteria indicative of metadata values of data items required for inclusion in the respective segment.

10. The computerized method of claim 8, wherein the first or the second metadata criteria are received from user input.

11. The computerized method of claim 8, wherein the plurality of segments and associated statistical attributes for all of the time intervals within the analysis time period are stored in a single data set.

12. The computerized method of claim 8, further comprising:
receiving user input indicating a requested time period;
identifying, in the data insights database, one or more time intervals associated with the requested time period;
aggregating statistical attributes of the identified one or more time intervals associated with the requested time period; and
causing presentations in a user interface of at least some of the aggregated statistical attributes.

13. The computerized method of claim 8, further comprising:
controlling an external technical system based on the first or the second indications of the first or the second segments and the associated first or the second statistical attributes associated with the first time interval, wherein the external technical system is a computer network or an area or building access system that is being controlled in real-time.

14. A non-transitory computer readable medium having software instructions stored thereon, the software instructions executable by a hardware computer processor to cause a computing system to perform operations comprising:
accessing a plurality of event data items associated with an analysis time period, each of the event data items including a timestamp, a non-time related data value indicating network log data or health-related data, and a metadata value;

determining a first time interval of a plurality of time intervals within the analysis time period;

identifying those event data items of the plurality of event data items with time stamps within the first time interval;

for a first segment of a plurality of segments associated with a first metadata criteria:
- identifying any event data items having a time stamp within the first time interval matching the first metadata criteria;
- associating the identified event data items with the first segment; and
- calculating a first statistical attribute from the data values of the identified event data items associated with the first segment;

for a second segment of the plurality of segments associated with a second metadata criteria different than the first metadata criteria:
- identifying any event data items having a time stamp within the first time interval matching the second metadata criteria;
- associating the identified event data items with the second segment; and
- calculating one or more second statistical attributes from the data values of the identified event data items associated with the second segment; and storing, in a data insights database, in association with the first time interval:
- a first indication of the first metadata criteria and the first statistical attribute for data items with timestamps within the first time interval; and
- a second indication of the second metadata criteria and the second statistical attribute for data items with timestamps within the first time interval; wherein the first or the second metadata criteria used to partition time-based data items includes one or more of: a URL or a time from request to response.

15. The non-transitory computer readable medium of claim 14, wherein each of the plurality of segments is associated with one or more metadata criteria indicative of metadata values of data items required for inclusion in the respective segment.

16. The non-transitory computer readable medium of claim 15, wherein the plurality of segments and associated statistical attributes for all of the time intervals within the analysis time period are stored in a single data set.

17. The non-transitory computer readable medium of claim 14, the operations comprising:
controlling an external technical system based on the first or the second indications of the first or the second segments and the associated first or the second statistical attributes associated with the first time interval, wherein the external technical system is a computer network or an area or building access system that is being controlled in real-time.

* * * * *

UNITED STATES PATENT AND TRADEMARK OFFICE
CERTIFICATE OF CORRECTION

PATENT NO. : 12,229,111 B2
APPLICATION NO. : 17/411448
DATED : February 18, 2025
INVENTOR(S) : Bruno Rahle Page 1 of 1

It is certified that error appears in the above-identified patent and that said Letters Patent is hereby corrected as shown below:

In the Claims

In Column 17, Claim 5, Line 22, delete "statistical attributes include" and insert --statistical attribute include--.

Signed and Sealed this
Eighth Day of April, 2025

Coke Morgan Stewart
*Acting Director of the United States Patent and Trademark Office*